United States Patent
Kawasaki et al.

[11] Patent Number: 6,167,186
[45] Date of Patent: Dec. 26, 2000

[54] VIDEO RECORDING DEVICE FOR RETROACTIVELY REPRODUCING A VIDEO IMAGE OF AN EVENT, WHILE ALSO RECORDING IMAGES IN REAL TIME

[75] Inventors: Kaoru Kawasaki; Minoru Ozaki; Fumio Matsuda; Kazuya Sato, all of Tokyo, Japan

[73] Assignee: Mitsubishi Denki Kabushiki Kaisha, Tokyo, Japan

[21] Appl. No.: 08/965,042

[22] Filed: Nov. 5, 1997

[30] Foreign Application Priority Data

Nov. 7, 1996 [JP] Japan .................................. 8-295009

[51] Int. Cl.[7] ................................... H04N 5/91
[52] U.S. Cl. ........................... 386/46; 386/124; 386/125; 360/5; 348/152
[58] Field of Search ............................... 386/1, 46, 117, 386/124, 125, 129, 45; 360/5, 7; 369/32, 50; 348/152–155, 143; H04N 5/91

[56] References Cited

U.S. PATENT DOCUMENTS

| | | |
|---|---|---|
| 4,281,354 | 7/1981 | Conte . |
| 4,807,179 | 2/1989 | Clere et al. ................................. 360/5 |
| 5,025,324 | 6/1991 | Hashimoto ................................ 360/5 |
| 5,140,436 | 8/1992 | Blessinger ................................ 360/5 |
| 5,184,215 | 2/1993 | Barker ..................................... 360/5 |
| 5,345,430 | 9/1994 | Moe ......................................... 360/7 |
| 5,455,561 | 10/1995 | Brown .................................... 348/155 |
| 5,920,673 | 7/1999 | Yasukohchi et al. ..................... 386/46 |
| 5,973,867 | 10/1999 | Yamamoto ............................... 360/5 |

FOREIGN PATENT DOCUMENTS

| | | |
|---|---|---|
| 2132599 | 5/1990 | Japan . |
| 4219090 | 8/1992 | Japan . |

*Primary Examiner*—Wendy Garber
*Assistant Examiner*—Vincent F. Boccio
*Attorney, Agent, or Firm*—Sughrue, Mion, Zinn, Macpeak & Seas, PLLC

[57] ABSTRACT

An input image is digitized. The corresponding digital video data are reproduced while they are successively recorded on a magnetic video device. A successive recording control unit manages at which position of a successive recording area the digital data are to be successively recorded to realize the endless recording in a limitative recording area. When an event occurs, the control unit manages to exclude the recorded image before and after the corresponding event image from the endless recording area so that the event image can be held as an event recording image. Since the monitored image can be reproduced while it is recorded, it can be reproduced timely retroactively, and the image before and after an event occurs can also be reproduced instantaneously. Further, since the recording is continued while the image is reproduced, event images corresponding to plural events can be left.

5 Claims, 9 Drawing Sheets

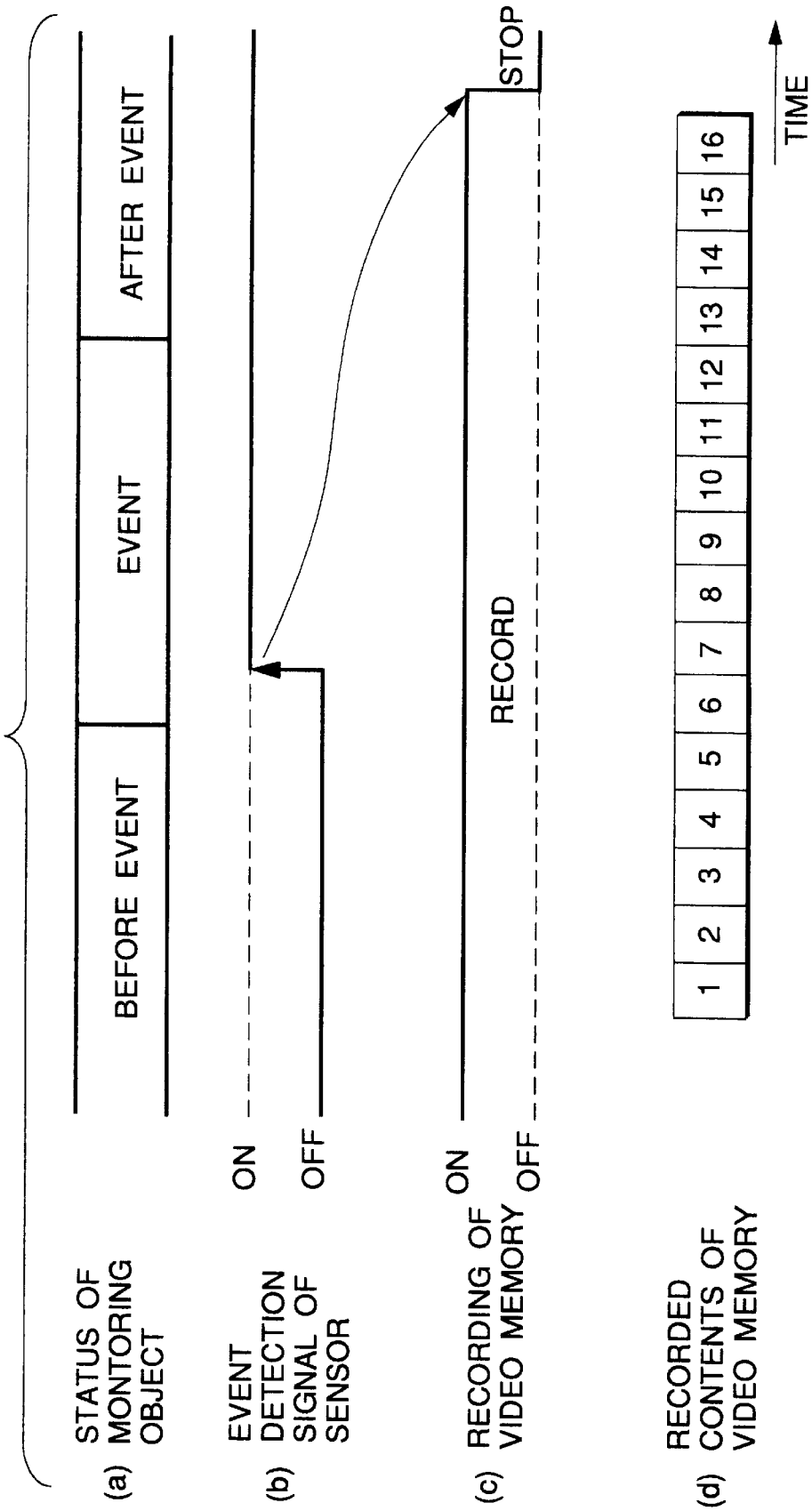

VIDEO RECORDING DEVICE FOR RETROACTIVELY REPRODUCING A VIDEO IMAGE OF AN EVENT, WHILE ALSO RECORDING IMAGES IN REAL TIME

BACKGROUND OF THE INVENTION

The present invention relates to a video recording device for recording a digitized video image inputted from a camera into a digital storage memory, and more particularly to a video recording device which is capable of retroactively reproducing a video image (event video image) generated when any event occurs while it records a video image monitored in real time.

An example of the means for recording digitized video information and reproducing the pertinent video image at any timing on demand is a video on-demand system. With video information previously stored in a storage device of a video server system, when a demand for transmitting the video image comes from the reproducing terminal device, the video on-demand system reads the video information according to the demand and sends it to the reproducing terminal device.

An example of the means for recording a video image which is not digitized but inputted in real time is a videotape recorder (VTR). Particularly, a "time lapse VTR" has a purpose of monitoring by video image and intends to review later the video image when any event occurs.

FIG. 8 is a block diagram of a video recording device disclosed in JP-A-2-132599. FIG. 9 is a timing chart of the operation of the device. In this video recording device, a video image inputted from a camera is recorded in a video memory 85 and the recording of the video memory 85 is stopped at a timing responding to an input from a sensor 84, and the video image before and after the sensor 84 produces an event detecting signal that can be displayed. However, since the recording is stopped in response to the signal from the sensor, when the next events occur successively, the video image before and after the event cannot be stored.

Generally, the video on-demand system, before video service is started, previously records and stores video information in the storage device of a video server system. Upon completion of the recording of the video information, the video on-demand system makes video on-demand service. Therefore, the video on-demand system cannot reproduce the video data while they are recorded.

The time lapse VTR, when any event occurs for an object being monitored, can perform its rewind operation to confirm circumstances of the event. In this case, however, the VTR cannot record video data during the rewind operation. Therefore, when another event occurs during the rewind operation, the time lapse VTR cannot have the video data recorded. In addition, generally, the time lapse VTR is not designed for the purpose of reproducing the video data instantaneously. Rather, after the recording for a week or so is completed, it is used to analyze an event if any event occurred during the period.

Although the device disclosed in JP-A-2-132599 can review the status before and after the event, it cannot deal with another subsequent event since it stops recording during the period.

SUMMARY OF THE INVENTION

The present invention has been accomplished to solve the above problem and intends to provide a device which can always record the video image inputted in real time and reproduce the image recorded last without stopping the recording. The present invention also intends to provide a system which can preserve the video image (recorded event image) before and after the event recorded in the video recording device has occurred, as historical record of video information for a long time.

The video recording device according to the present invention comprises a digital video information inputting unit for inputting digital video data in real time, a temporary storage unit for temporarily storing the video data inputted form the digital video data inputting unit, a successive recording unit for intermittently reading out the video data from the temporary storage unit and overwriting the video data for recording, and a successive recording control unit for controlling a recording area in the successive recording unit. In the video recording device, the successive recording control unit records the video data from the temporary memory unit in endless recording mode and in accordance with an external event signal, it excludes a recording area correlated with the event signal from the area subjected to the endless recording so that it is managed as an event recording area.

Furthermore, in the video recording device according to the present invention, the recording area correlated with the event signal is defined as a recording area from a predetermined time before to a predetermined time after the event signal is inputted.

Furthermore, in the video recording device according to the present invention, the successive recording control unit divides the recording area into blocks, assigns block numbers for each blocks, and controls the recording area using the block numbers as pointers.

Moreover, in the video recording device according to the present invention, the successive recording control unit monitors the recording capacity of the endless recording area from which the event recording area is excluded, and when the recording capacity is short for the recording period of the endless recording, it restores the event recording areas as endless recording areas successively in order of older setting or lower priority.

Still further, the video recording device according to the present invention further comprises a long-term storage unit, and in that the recording contents of the event recording area is transferred to the long-term storage unit so that the event recording area is restored as an endless recording area.

BRIEF DESCRIPTION OF THE DRAWINGS

FIG. 9 is a time chart showing the operation of FIG. 8.

DETAILED DESCRIPTION OF THE PREFERRED EMBODIMENTS

Embodiment 1

Figure 1:
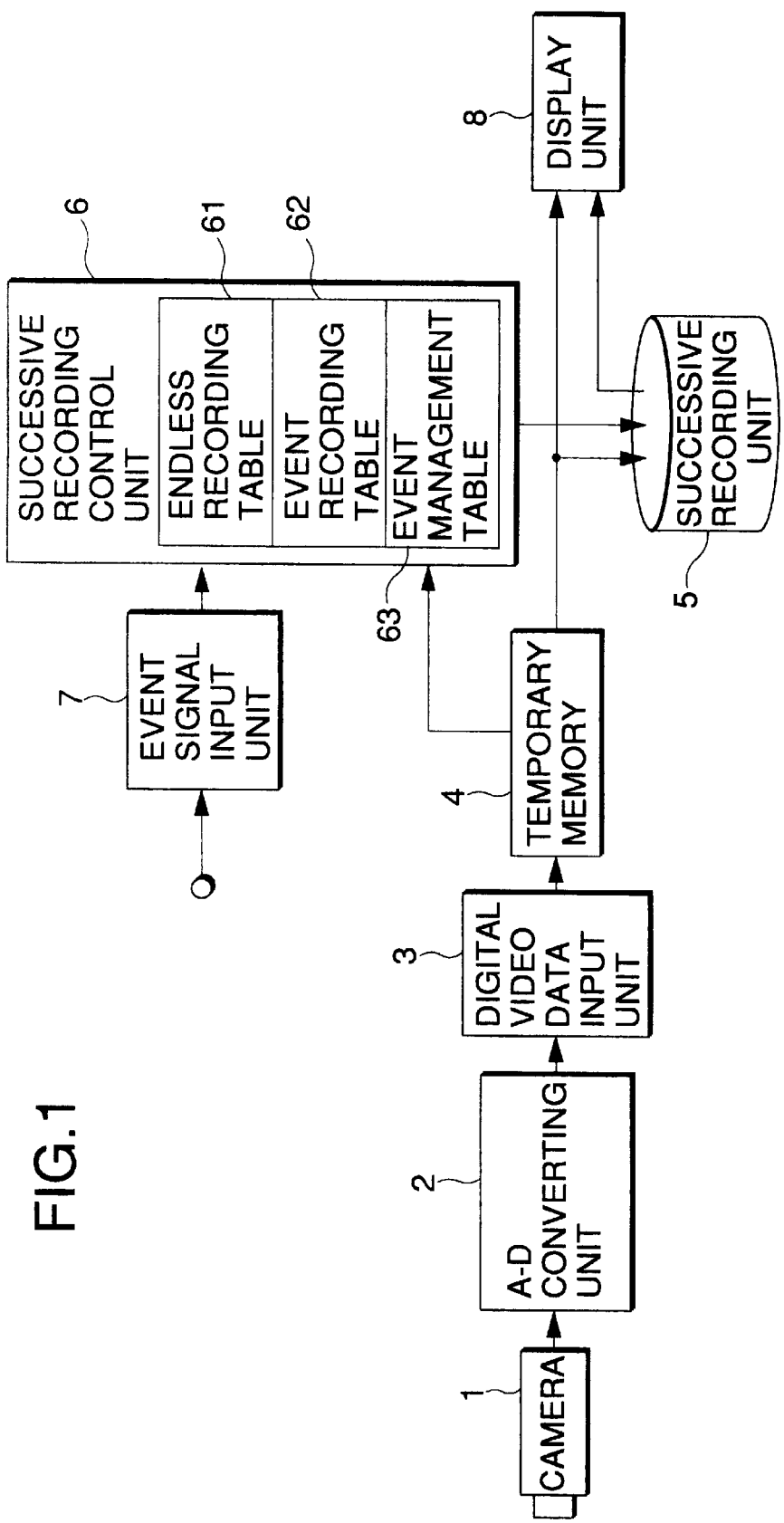
FIG. 1 is a block diagram of a video recording device according to an embodiment of the present invention.

An explanation will be given of the first embodiment of the present invention. In FIG. 1, reference numeral 1 denotes a camera; 2, an A-D (analog-digital) converting unit for converting an input video image into a digital signal; 3, a digital video data inputting unit; 4, a temporary memory constructed of e.g. a semiconductor memory; 5, a successive recording unit constructed of a magnetic disk device; 6, a successive recording control unit for managing and controlling the recording and reproducing processes of the successive recording unit; 7, an event signal inputting unit for inputting event signals from various kinds of sensors; and 8, a video display unit for displaying the digital image reproduced from the successive recording unit 5 and the input image supplied directly from the temporary memory unit 4. Reference numeral 61 denotes an endless recording table for recording a pointer indicative of an area subjected to the endless recording; 62, an event recording table for recording a pointer indicative of an area subjected to event recording; and 63, an event management table for managing the occupying state of the endless recording table 61 and event recording table 62.

Figure 2:
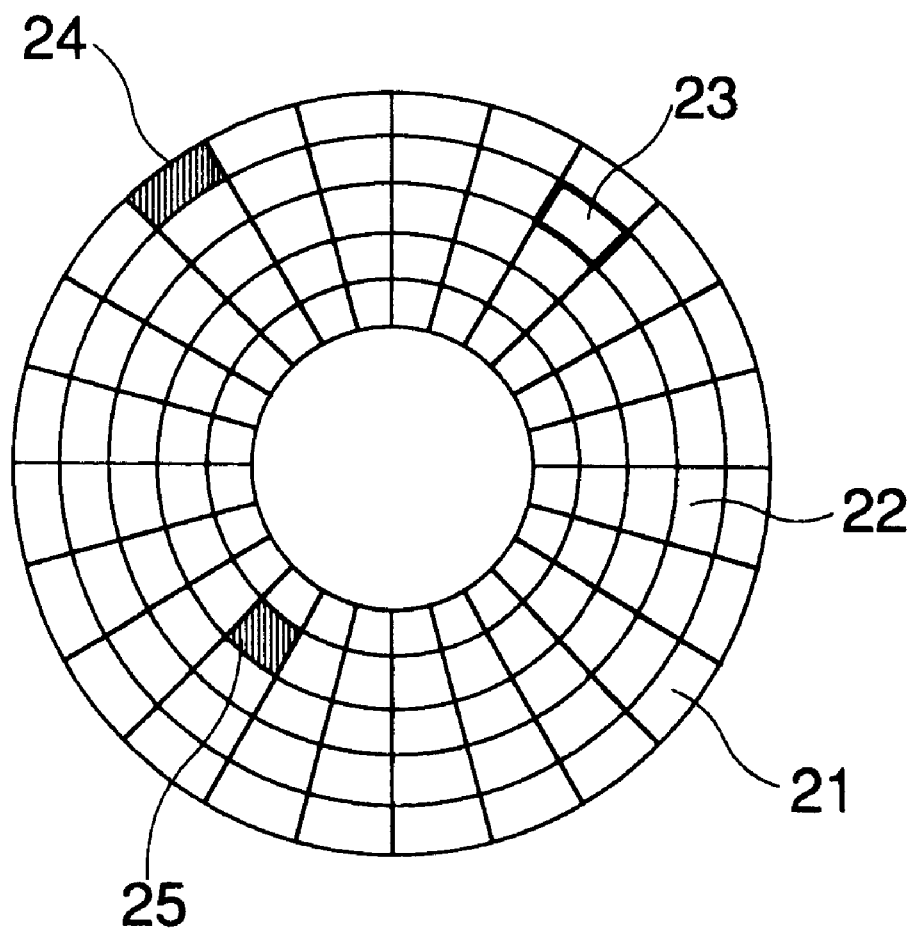
FIG. 2 is an explanation view of the magnetic disk medium of a magnetic disk device.

A detailed explanation will be given of the operation of the successive recording unit 5. Generally, the successive recording unit 5 is constructed of e.g. a magnetic disk device, and records the digital video data on a large number of concentric tracks 22 of a magnetic disk medium 21 as shown in FIG. 2. One circle of each track is recorded so as to be divided into predetermined units called sectors 23. Therefore, the recording is executed after a magnetic head is shifted to a recording track position (seek processing) and arrives at a desired sector 23. The reproducing processing is also executed after the magnetic head arrives at the sector from which the data is to be reproduced, thereby reproducing desired digital information. When the recording and reproducing are repeated for each sector unit, if the recording sector 24 and the reproducing sector 25 are separate, the time for seeking will be longer than those for recording and reproducing. In order to enhance the performance of the recording and reproducing processing speed in the magnetic disk device, the digital information must be continuously recorded on or reproduced from continuous sectors.

Figure 3:
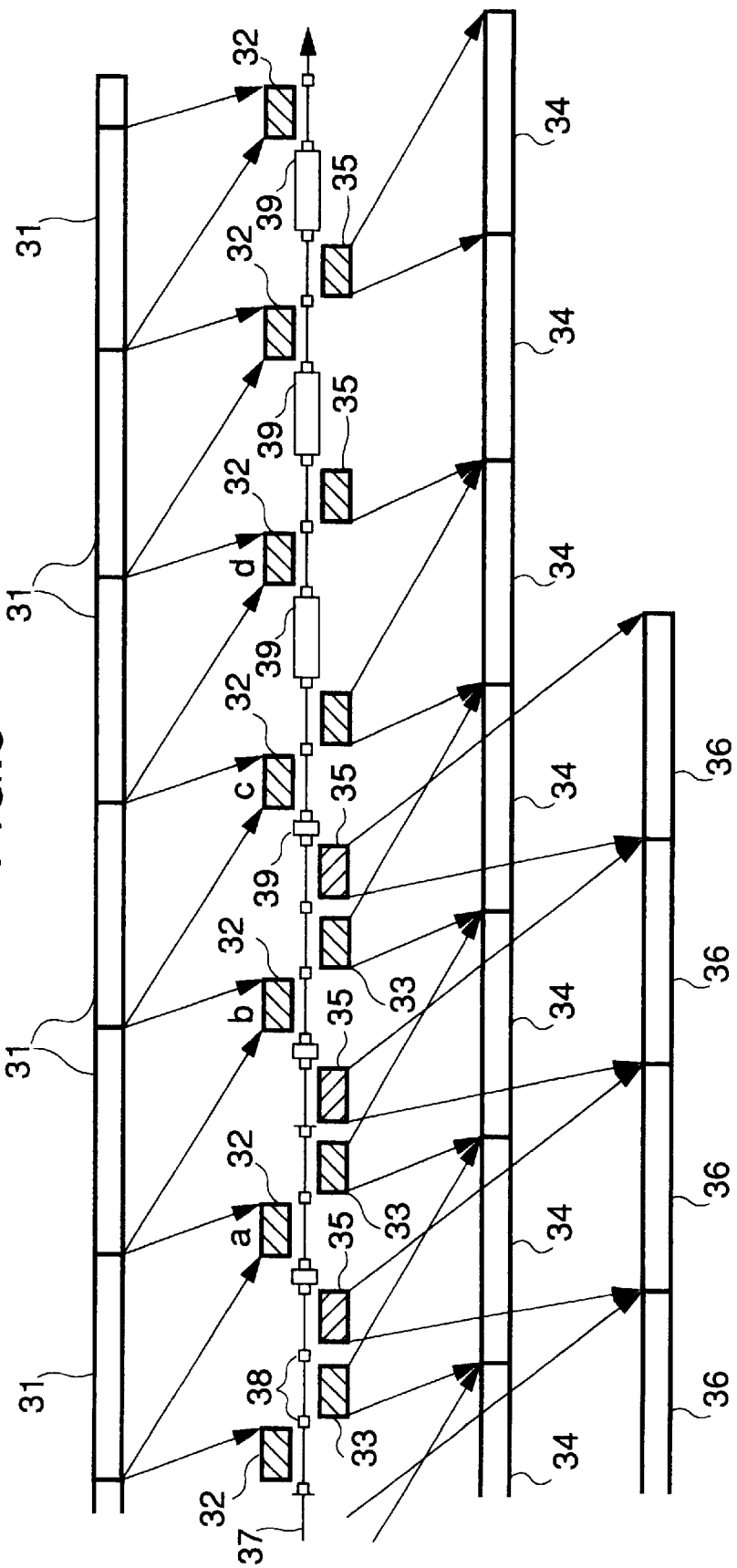
FIG. 3 is a time chart for explaining the access to a successive recording unit.
Figure 4:
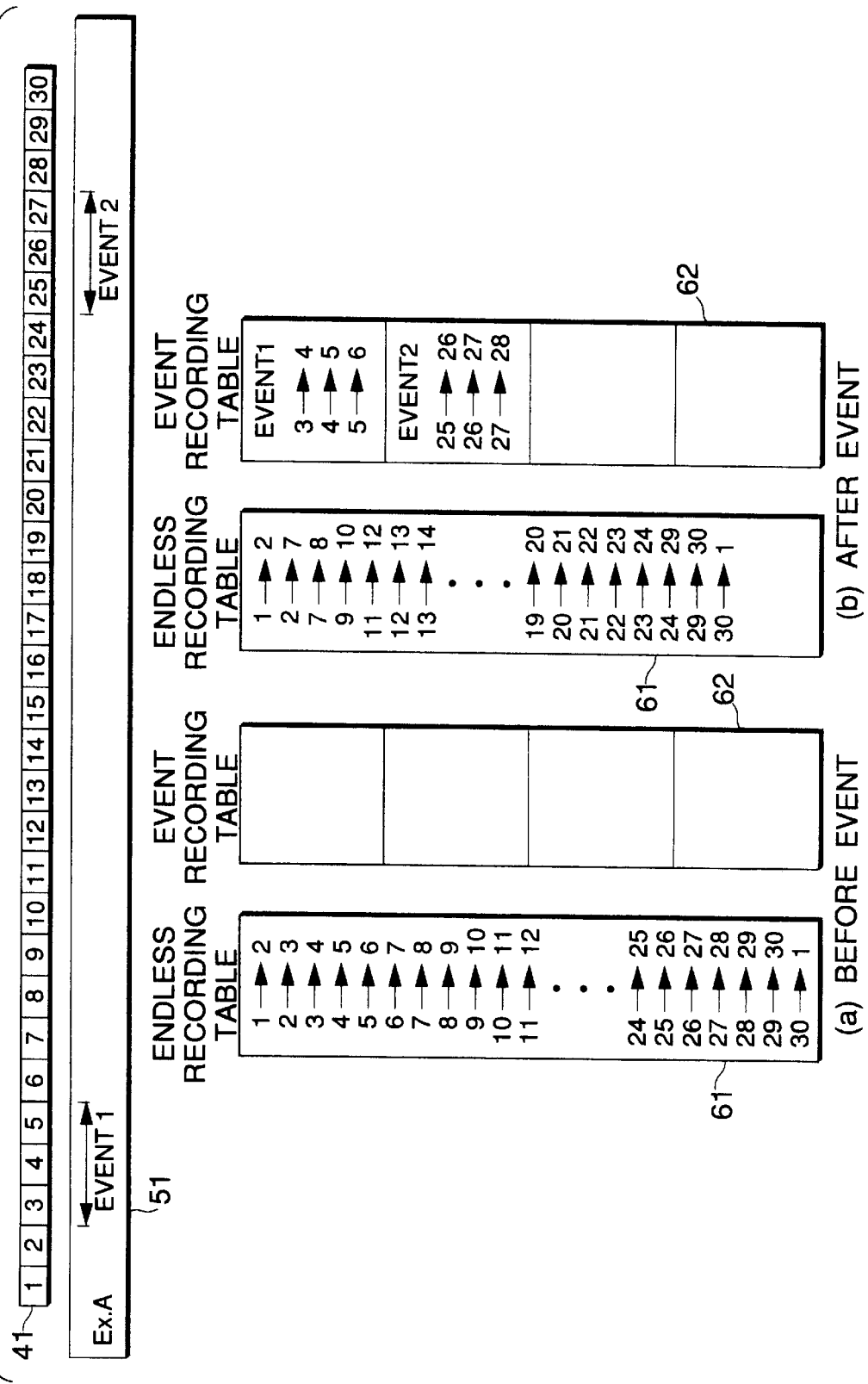
FIG. 4 is a conceptual view for explaining the management of endless recording and event recording.

The digital video information is continuously inputted. For example, the data compressed in a moving picture at a rate of 20 Kbyte for $\frac{1}{30}$ sec are inputted successively. The seek processing takes a time of 0.1 sec or so. In this case, in order to reduce the number of times of the seek processing as described above, it is recommended to compile the video data into blocks each with e.g. 0.5 sec or so and intensively record and reproduce these data. Although the magnetic disk device has a large storage capacity of e.g. 1 Gbyte, the digital video data, even if compressed, has also a large data size of 600 Kbyte/sec as mentioned above. Therefore, the magnetic disk device can record the digital video data on the magnetic disk medium for only about 30 minutes or shorter. Referring to FIGS. 3 and 4, an explanation will be given of the mechanism of making the endless recording by the successive recording unit 5 which is an object of the present invention. In FIG. 3, with a time in its abscissa, the accessing status in the successive recording unit 5 will be explained for the processes of recording and reproducing.

In FIG. 3, reference numeral 31 denotes digital video information strings at the digital video data inputting unit 3. These video information strings are once stored in the temporary storage unit 4, and read out as intermittent recorded information strings 32. These information strings 32 are recorded in the successive recording unit 5. Although it is illustrated in FIG. 3 that the recorded information strings are recorded endlessly at four points of a, b, c and d, actually, they are recorded at more points. On the other hand, reference numeral 33 denotes one of reproduced information strings. These reproduced information strings are reproduced from the successive recording unit retroactively by any time of the image recorded endlessly. Then, they are displayed as successive reproduced video information strings 34 in a moving picture on the video display unit 8. In this way, according to this embodiment, while the recording is continued, the reproducing can be executed so that in instant response to the event signal, the recorded video image can be reviewed. If there is a further allowance of access in the successive recording unit 5, the image belonging to another time interval can be retroactively read out as reproduced information strings 35. The reproduced information strings 35 can be also displayed as successive reproduced video information strings 36 in a moving image by the video display unit 8. FIG. 3 illustrates that the reproduced data disappear on the way. This means that the video image reproduction in the video display unit has been stopped on the way. In the example illustrated in FIG. 3, the video display unit 8 can display the monitored video image which is being inputted at present and two kinds of delayed images. In FIG. 3, line 37 represents the status of the successive recording unit. Each of black square portions 38 denotes the time taken for the seek processing. Each of slender lines denotes the time taken for the recording or reproducing. Each of open square portions 39 denotes the access allowance time in the successive recording unit. This access allowance time 39 is formed to absorb the varying width of the seeking time 38 which may be varied.

Now referring to FIG. 4. an explanation will be given of a method of the processes of recording and reproducing in the successive recording control unit 6. Reference numeral 41 shows the state where the successive recording unit 5 is divided into a plurality of blocks (30 blocks in this example) labeled block numbers (pointers), respectively. Reference numeral 51 denotes a time zone of events which have occurred during the successive recording. The successive recording control unit 6 includes an endless recording table 61 and an event recording table 62, and manages the numbers of the blocks on which the digital video image is to be recorded as shown in part (a) of FIG. 4. The notation "1→2" in the part (a) represents that the recording block successive to block No. 1 is block No. 2. By provision of such a recording table, the blocks are overwritten in order from the block with an older record. Next, an explanation will be given of the operation when the successive recording control unit 6 receives an event signal from the event signal inputting unit 7. Now it is assumed that the event signal is inputted while the recording is made at the position of block No. 4. In this case, the video image from block No. 3 with a previously recorded image to block No. 6 with a video image after the event will be managed as an event video image. Since the present invention always executes the recording in a manner of endless recording, the video image inclusive of the video image prior to inputting of the event signal can be managed as an event video image. Thus, event No. 1 will be managed on the event recording table as shown in part (b) of FIG. 4. Event No. 2 will be managed similarly. Now if only the event recording table is updated as it is, the event video images are overwritten to disappear at a period of endless recording. For this reason, the endless recording table must be also modified. As shown in the part (b), notation "2→7" represents that the block Nos. 3, 4, 5 and 6 are excluded from the loop of the endless recording. Likewise, notation "24→29" saves the event video image of event No. 2 from the endless recording. In this way, in the endless recording area, the recording area correlated with the event signal will not be thereafter used as an endless recording and not overwritten so that the event video image will be held for a longer period than the endless recording period. Generally, a certain video image can be left as an event recording by copying the video image from the endless recording unit to the event recording holding area while the endless recording is done. However, as seen from the example shown in FIG. 3, since the access allowance time in the successive recording unit is limited, the present invention adopts a technique of avoiding any unnecessary copying.

Embodiment 2

Figure 5:
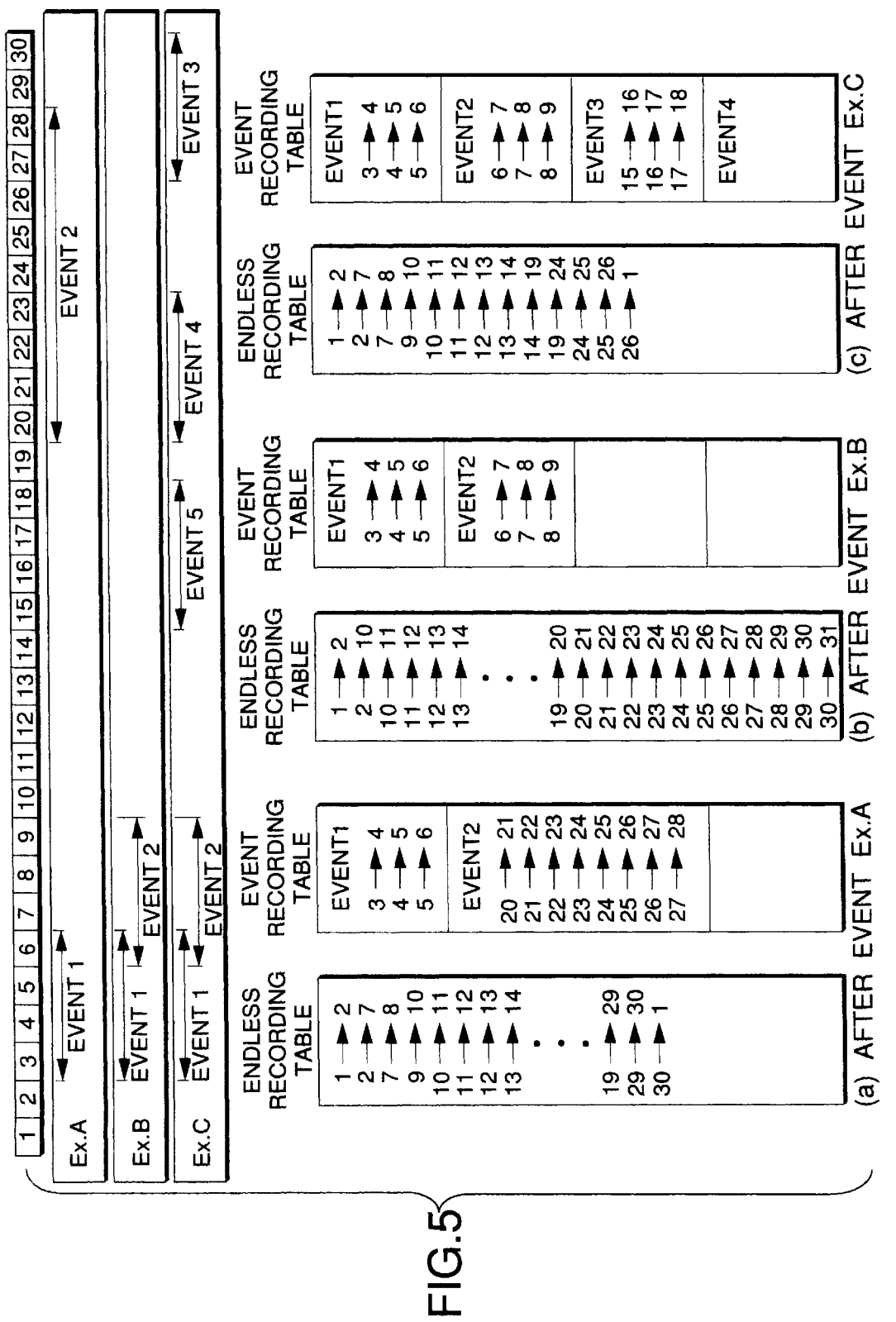
FIG. 5 is a conceptual view for explaining the management of endless recording and event recording.

In the above first embodiment, the recording time of the event video image has been set equally for any event. The event recording time may be changed according to the kind of events in a such a fashion that a long recording time is given to a slowly changing event whereas a short recording time is given to an instantaneous event. For example, a longer recording time is given to the event signal from a fire sensor so that the signal can be managed as an event video image from before a fire occurs, and a short event video image may be given to an event such as explosion. Further, in the above embodiment, although the block immediately before the event signal occurs has been held as the event video image, the block to be held as the event video image may be further retroactive according to an event circumstance. Thus, according to the kind of each of events, an event management table representative of the manner of holding the event video image (e.g. the block being caused to be retroactive before the event signal is inputted, the period when it is held as the event video image, etc.) can be arranged on the successive recording control unit 6. Part (a) in FIG. 5 shows an example of such a management table.

Embodiment 3

In the above second embodiment, a manner of managing the successive events has been given. However, where the event signals are successive so that the corresponding event recording times overlap, the endless recording table and the event recording table are applied as illustrated as shown in part (b) in FIG. 5 so that the event recording time is set as a time including the recording times of both event video images. Thus, the successive events like case B can be managed.

In the first, second and third embodiments, when an event occurs, the corresponding event video image is not recorded on a separate area, but the management table for the block numbers being subjected to the successive recording is only operated. Therefore, it is not necessary to transfer the video image immediately before the event occurs to the above separated area so that without wasting the access time in the successive recording unit, the video data in the successive recording unit can be reproduced as the event video image with an allowance. Namely, in the example, either one of the reproduced information strings 33 and 35 may not be used for event recording so that both information strings can be used as independent reproduced information strings.

Embodiment 4

The first to third embodiments described above have an advantage that it has only to operate the management table to manage the invent video image. However, if events occur frequently, as shown in part (c) of FIG. 5, the area to be registered for event recording may increase so that the endless recording area cannot be assured. In order to obviate such a failure, the event management table 63 manages the area for event recording to decide whether or not the endless recording time can be assured. In this case, if the endless recording time cannot be assured, the event video images which are older or have lower holding priorities can removed in order from the event recording table, thereby restoring the corresponding areas as endless recording areas.

Embodiment 5

Figure 6:
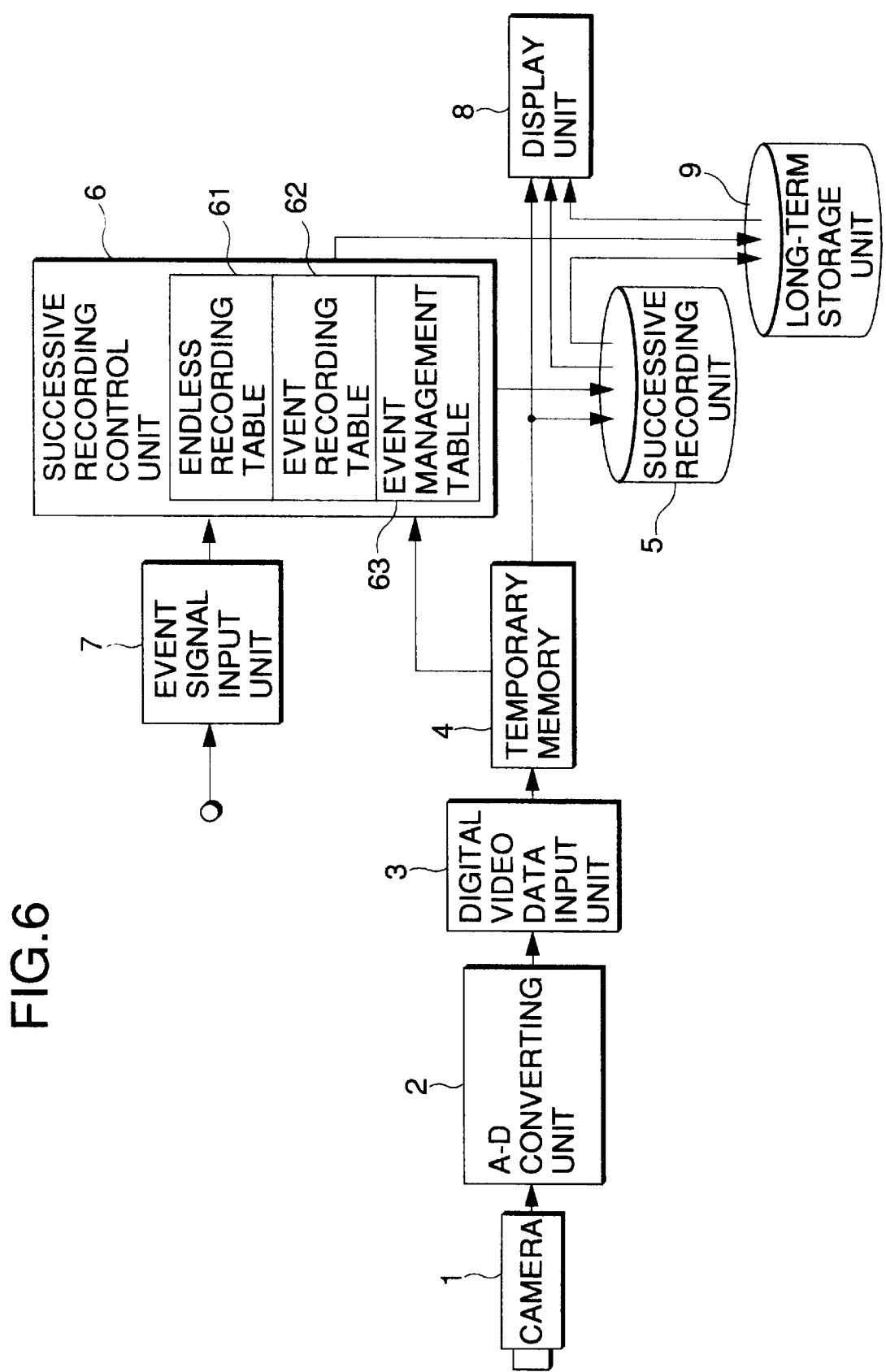
FIG. 6 is a block diagram of a video recording device according to an embodiment of the present invention.

The forth embodiment cannot hold the event video image substantially permanently. This embodiment, which has been accomplished to solve this problem, will be explained with reference to FIGS. 6 and 3. In FIG. 6, like reference numerals except a long-term storage unit 9 refer to like elements in FIG. 1. If the event video image stored in the successive recording unit 5 can be saved into the long-term storage unit 9, the event video image stored in the successive recording unit is not necessary. The event video image can be saved into the long-term storage unit 9 by copying it from the successive recording unit 5 into the long-term storage unit 9 using the access allowance time in the successive recording unit 5 represented by the open square portion 39 shown in FIG. 3. The copying operation, which is not an operation of reproducing a visual image and so not time-limited, can be executed successively using the access allowance time in the successive recording unit 5 as in the case of the general copying operation of the digital data. The presence or absence of the saving of the event video image stored in the successive recording unit 5 can be managed using the event management table 63 of the successive recording control unit 6, or otherwise using another management table provided separately in the video display unit.

Figure 7:
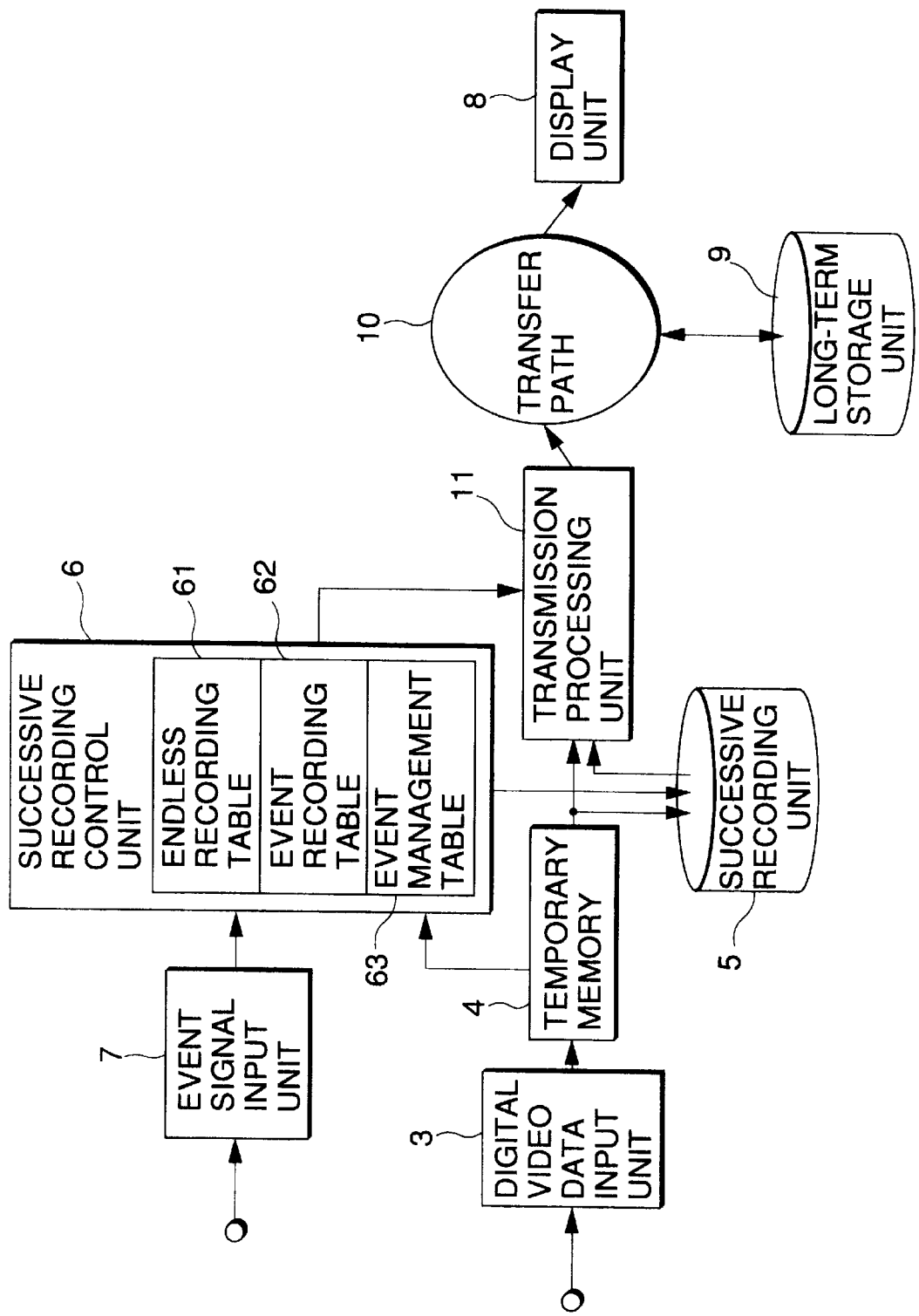
FIG. 7 is a block diagram of a video recording device according to an embodiment of the present invention.
Figure 8:
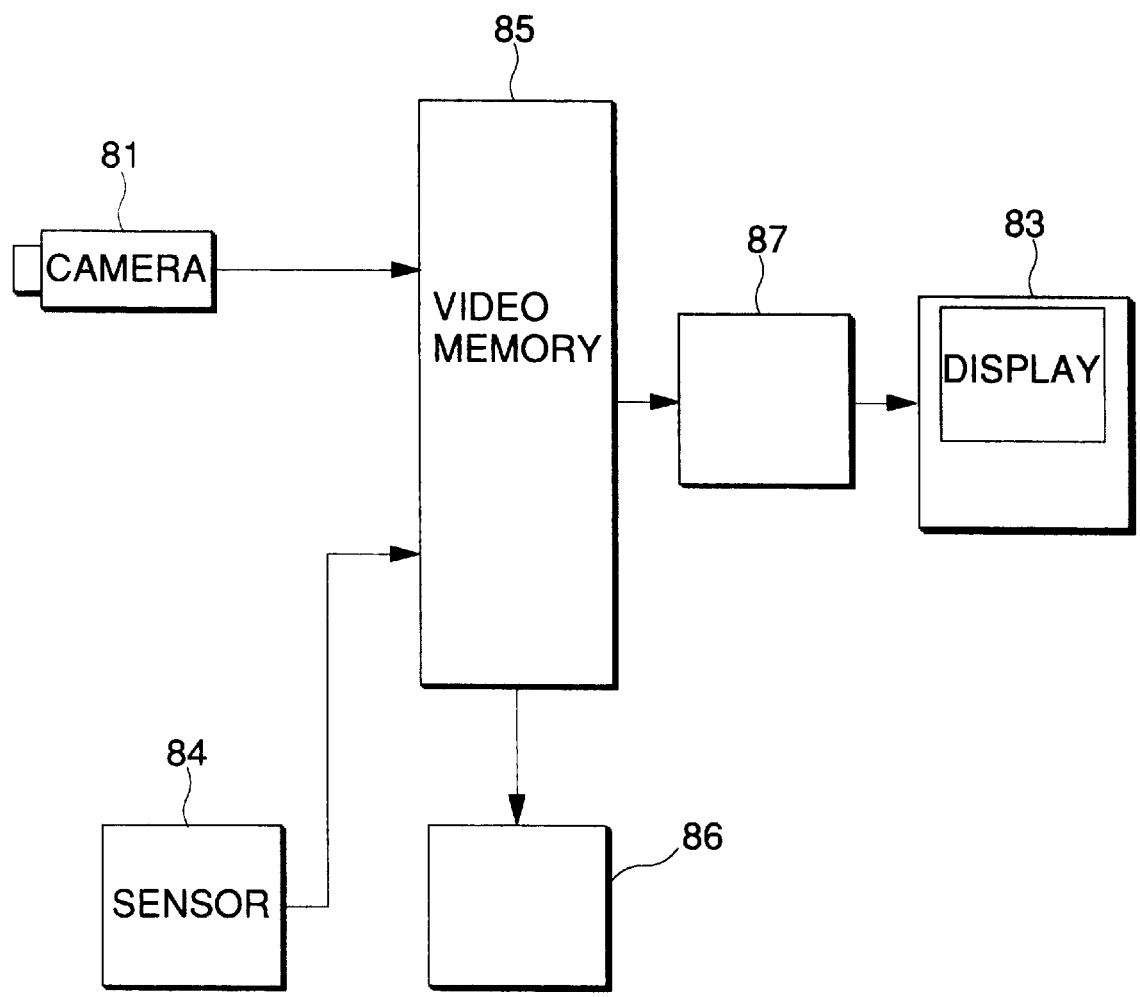
FIG. 8 is a block diagram of a prior art.

FIG. 7 is an embodiment in which the digital video image inputting unit 3 and the successive recording unit 5 are apart from the video display unit 8 through a transfer path 10. In this case, on the side of the digital video image inputting unit 3, a transmission processing unit 11 is provided in place of the video display unit 8 and is connected to the video display unit 8 through the transmission path. The long-term storage unit is connected to the video display unit 8 through the transmission path. It is needless to say that the configuration shown in FIG. 7 can provide the same advantage as in that of FIG. 6.

In the embodiments described above, a magnetic disk has been adopted as the successive recording unit. However, using other digital recording devices inclusive of a semiconductor memory and an optical disk device can provide the same advantage. Further, in the embodiments described above, the endless recording has been made on the endless recording table for managing it in the order of block numbers. However, it may not be made in the order of block numbers. Further, in the embodiments described above, on each management table, a next block number was arranged in succession to each block. However, where successive blocks are to be recorded and reproduced, the block numbers at the first position and last position have only to be managed so that the successive blocks can be managed using less amount of information. Furthermore, in the embodiments described above, the event recording has been managed for each block. However, the data of the event management table may be increased so that the bytes inclusive of any optional byte on the way of a certain block to that in the other block can be managed as the event recording.

As described above, in accordance with the present invention, since the successive recording unit is configured to enable the endless recording which is saved from the endless recording area as an event video image when an event input signal is received, the video image inclusive of the video image before the event signal is received can be recorded and stored as the event video image. In addition, since the event video image when an event occurs needs not to be transferred to a separate area, the access time in the successive recording unit can be efficiently used so that the event video image can be reproduced with a sufficient allowance.

What is claimed is:

1. A video recording device comprising:
   a digital video data inputting unit inputting digital video information in real time;
   a temporary storage unit for temporarily storing the video data inputted from said digital video data inputting unit;
   a successive recording unit for reading out said digital video data from said temporary storage unit, recording the digital video data in a recording area of said successive recording unit, said recording area comprising an event recording area and an endless recording area, and for overwriting the recorded digital video data; and
   a successive recording control unit for controlling said successive recording unit, wherein said successive recording control unit controls the recording of the digital video data in endless recording from said temporary storage unit to said recording area of said successive recording unit and,
   in accordance with an external event signal, video data is recorded in said event recording area correlated with the event signal, said event recording area being excluded from said endless recording area so that the video data is stored in said event recording area for a longer time than video data stored in said endless recording area.

2. A video recording device according to claim 1, wherein the event recording area correlated with the event signal is defined as a recording area from a predetermined time before to a predetermined time after the event signal input being inputted.

3. A video recording device according to claim 1, wherein said successive recording control unit divides the recording area into blocks, assigns block numbers for each block, and controls the recording area using the block numbers as pointers.

4. A video recording device according to claim 1, wherein said successive recording control unit monitors the recording capacity of said endless recording area from which said event recording area is excluded, and when said recording capacity is low, said control unit restores the event recording area as an endless recording area successively in order of older setting or lower priority.

5. A video recording device according to claim 1, further comprising a long-term storage unit for storing the digital video data, and
   wherein the recording contents of said event recording area is transferred to said long-term storage device so that said event recording area is restored as an endless recording area.

* * * * *